United States Patent [19]

You

[11] Patent Number: 5,598,335
[45] Date of Patent: Jan. 28, 1997

[54] SYSTEM AND METHOD FOR CONTROLLING A SHIFT POSITION WHEN A VEHICLE TRAVELS ALONG A STEEPLY SLOPED ROAD OR A SHARPLY CURVED ROAD

[75] Inventor: Jinho You, Seoul, Rep. of Korea

[73] Assignee: Hyundai Motor Company, Seoul, Rep. of Korea

[21] Appl. No.: 417,693

[22] Filed: Apr. 6, 1995

[30] Foreign Application Priority Data

Apr. 6, 1994 [KR] Rep. of Korea .................. 94-7178

[51] Int. Cl.⁶ ................... G06F 7/70; F16H 59/30
[52] U.S. Cl. .............. 364/424.094; 364/426.043; 477/97; 477/901; 477/120; 477/78
[58] Field of Search ............... 364/424.01, 424.02, 364/424.03, 424.05, 426.01, 426.02, 426.03, 424.1, 426.04; 180/147, 422, 248; 280/707, 840, 169, 271; 74/866; 477/97, 120, 901, 902, 129, 131, 125, 903, 78

[56] References Cited

U.S. PATENT DOCUMENTS

| 4,354,236 | 10/1982 | Miki et al. ................. 364/424.1 |
| 4,670,845 | 6/1987 | Etoh .......................... 364/426.04 |
| 4,692,866 | 9/1987 | Kosuge ....................... 364/424.1 |
| 4,747,055 | 5/1988 | Eto et al. ................... 364/424.01 |
| 5,270,930 | 12/1993 | Ito et al. ................... 364/424.1 |
| 5,276,624 | 1/1994 | Ito et al. ................... 364/424.05 |
| 5,319,555 | 6/1994 | Iwaki et al. ................. 364/424.1 |
| 5,361,207 | 11/1994 | Hayafune ..................... 364/424.1 |
| 5,366,424 | 11/1994 | Wataya ........................ 477/107 |
| 5,390,116 | 2/1995 | Hayafune ..................... 364/424.05 |
| 5,510,990 | 4/1996 | Hibino et al. ................ 364/424.1 |
| 5,513,108 | 4/1996 | Kishimoto et al. ............. 364/424.05 |

*Primary Examiner*—Gary Chin
*Assistant Examiner*—Jacques Louis-Jacques

[57] ABSTRACT

The present invention is directed to a device and a method for controlling a shift position of a vehicle in response to a road condition when the vehicle is running on a steeply sloped road or a sharply curved road. The device includes a slope/curve sensor, a steering angle sensor, a throttle valve sensor, a vehicle speed sensor, and a shift controller. A solenoid valve controls a hydraulic pressure and the resulting shift position in response to a control signal applied from the shift controller.

9 Claims, 4 Drawing Sheets

SYSTEM AND METHOD FOR CONTROLLING A SHIFT POSITION WHEN A VEHICLE TRAVELS ALONG A STEEPLY SLOPED ROAD OR A SHARPLY CURVED ROAD

BACKGROUND OF THE INVENTION

1. Field of the Invention

The present invention relates to a system and a method for controlling a shift position when a vehicle travels along a steeply sloped road or a sharply curved road. More particularly, it relates to a system and a method for controlling a shift position when a vehicle travels along a steeply sloped road or a sharply curved road which may have a high efficiency of running in normal speed or reducing speed in response to a sloping or curving condition of a road.

2. Description of the Prior Art

In general, when a vehicle travels along an uphill road, more driving force is required than that when the vehicle runs on a level road. Accordingly, if the vehicle runs on the uphill road using an engine output or an ignition timing for running on the level road, the engine is overloaded and may easily become out of order.

In a vehicle having an automatic transmission, the vehicle running condition is dependent upon the condition of vehicle. However, the external condition of the vehicle has a great effect on the vehicle running.

For example, a relatively large torque is required when the vehicle travels uphill and a relatively small torque is required to travel downhill compared with that when the vehicle is running on the level road.

In addition, the acceleration is required after speed reduction for slow-in-fast-out on a sharply curved road.

The conventional art for the vehicle to run smoothly while compensating an injecting amount of fuel and an ignition timing according to the running condition of the vehicle in case of the vehicle running on the uphill road is disclosed in Korean Patent Application No. 93-27602 entitled "A system and a method for controlling operation of an engine when a vehicle turns on a sloped road".

According to the above techniques, in case that the downhill road - uphill road - downhill road are alternatively continued, although an accelerator pedal is released to reduce vehicle speed for travelling along the downhill road after travelling along the uphill road the vehicle speed is still accelerated since an up-shift state remains.

In addition, although the accelerator pedal is released in case of the vehicle is travelling along the sharply curved road without reducing the vehicle speed, the vehicle speed is still accelerated and the vehicle is pushed out of a turning direction by centrifugal force since up-shift state still remains.

SUMMARY OF THE INVENTION

It is an object of the present invention to provide a system and a method for controlling a shift position in response to a road condition when a vehicle travels along a steeply sloped road or a sharply curved road, thereby reducing a risk of causing an accident due to an upshift by holding or down-shifting a present shift position according to an intention to reduce a speed or to run at a normal speed in case a vehicle speed is over a predetermined speed when the vehicle travels along a steeply sloped road or a sharply curved road.

To achieve the above and other objects, the present invention proposes a system and a method for controlling a shift position when the vehicle travels along a steeply sloped road or a sharply curved road, comprising:

- a slope/curve sensor for sensing a sloping or curving condition of a road, converting the condition into an electric signal, and outputting the signal;
- a steering angle sensor for sensing a steering angle in response to the operation of a steering wheel, converting the sensed angle into an electric signal, and outputting the signal;
- a throttle valve sensor for sensing an opening size of a throttle valve cooperating with an accelerating pedal, converting the sensed opening size into an electric signal, and outputting the signal;
- a vehicle speed sensor sensing a running speed of the vehicle, converting the sensed speed into an electric signal, and outputting the signal;
- a shift controller for sensing the road condition, the operation of the steering wheel and the vehicle speed, and holding or down-shifting a present shift position in response to a reduction in speed, uphill travel, downhill travel, or curved road condition, and if the vehicle runs over a predetermined speed; and
- a solenoid valve for controlling a hydraulic pressure in response to a control signal applied from the above shift controller.

As the other aspect of the present invention, a method for controlling the shift position when the vehicle travels along the steeply sloped road or the sharply curved road comprises the steps of:

- initializing all operating circuits and used variables upon starting the vehicle, and sensing a sloping or curving condition of a road and a first steering angle according to the operation of a steering wheel;
- determining a reduction of vehicle speed by sensing the change of an opening size of a throttle valve per second, and sensing a present vehicle speed;
- determining a road condition, setting a corresponding flag respectively to an uphill road, a downhill road, or a curved road, and determining if the vehicle speed is over a predetermined speed; and
- performing a control routine in response to a road condition by interrupting a current routine and finishing in case the road is uphill, downhill, or curved, and the vehicle speed is over a predetermined speed.

BRIEF DESCRIPTION OF THE DRAWINGS

Further advantages and other objects of the present invention will be apparent in the following detailed description in connection with the accompanying drawings, in which.

DETAILED DESCRIPTION OF THE PREFERRED EMBODIMENTS

Figure 1:
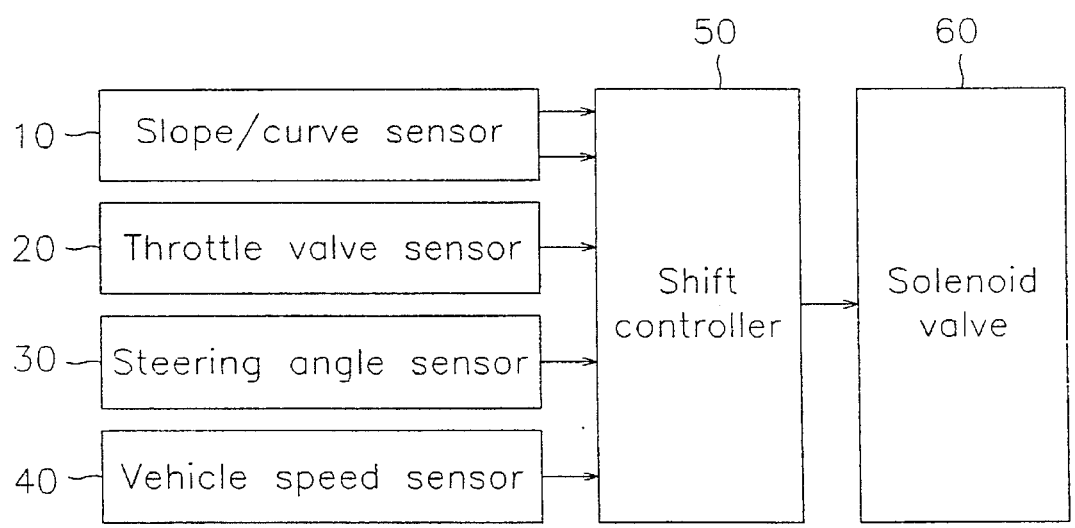
FIG. 1 is a block diagram of a system for controlling a shift position when a vehicle travels along a steeply sloped road or a sharply curved road in accordance with a preferred embodiment of the present invention.

As shown in FIG. 1, the system for controlling the shift position when the vehicle travels along the steeply sloped road or the sharply curved road comprises a slope/curve sensor 10 for sensing a sloping or curving condition of a road and a throttle valve sensor 20 for sensing an opening size of a throttle valve cooperating with an accelerating pedal. The inventive system further comprises a steering wheel angle sensor 30 for sensing a steering angle according to the operation of a steering wheel, a vehicle speed sensor 40 mounted on a wheel cylinder of a wheel for sensing a vehicle speed, a shift controller 50 connected with output terminals of the above sensors 10 to 40, for controlling the shift position according to the vehicle speed and a road condition, and a solenoid valve 60 connected with an output terminal of the above shift controller 50.

Figure 2:
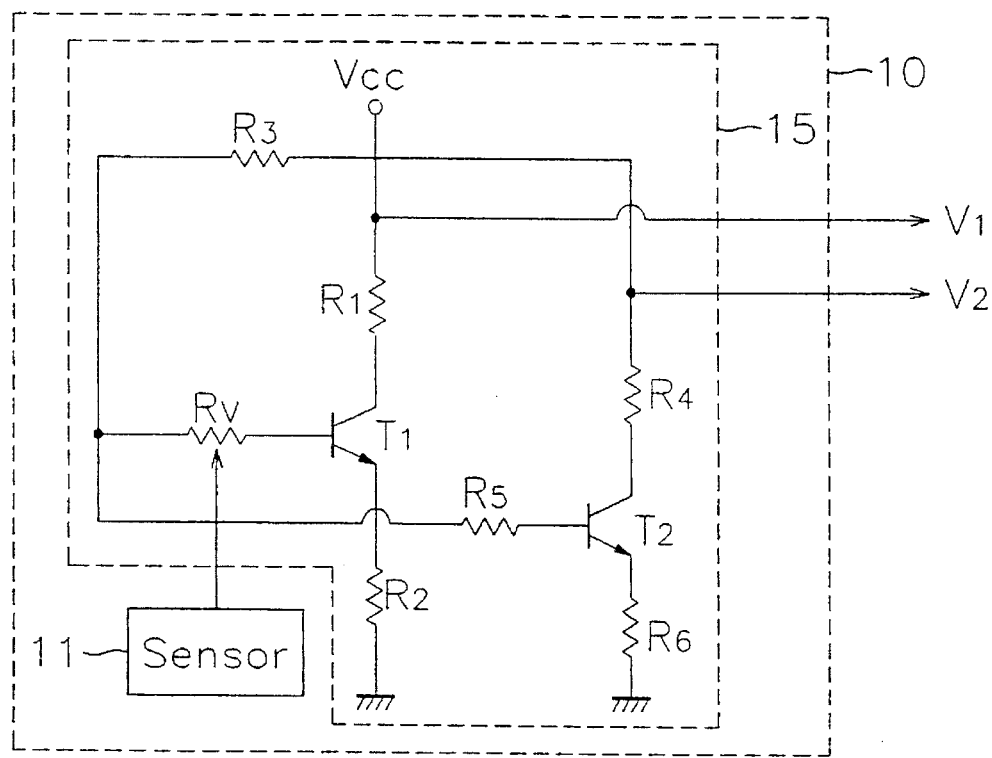
FIG. 2 is a detailed circuit diagram of a slope/curve sensor of the system for controlling the shift position when the vehicle travels along the steeply sloped road or the sharply curved road in accordance with the preferred embodiment of the present invention.

As shown in FIG. 2, the above slope/curve sensor 10 comprises a sensor 11, and a voltage output means 15 of which an input terminal is connected with an output terminal of the sensor 11.

The voltage output means 15 comprises resistance R1 of which one side terminal is connected with a power terminal, transistor T1 of which a collector is connected with the other side terminal of the resistance R1, resistance R2 of which one side terminal is connected with an emitter of the transistor T1, and the other side terminal is grounded, variable resistance Rv of which one side terminal is connected with a base of the transistor T1, resistance R3 of which one side terminal is connected with the other side terminal of the variable resistance Rv, resistance R4 of which one side terminal is connected with the other side terminal of the resistance R3, transistor T2 of which a collector is connected with the other side terminal of the resistance R4, resistance R5 of which one side terminal is connected with the one side terminal of the resistance R3 and the other side terminal is connected with base of the transistor T2, and resistance R6 of which one side terminal is connected with emitter of the transistor T2 and the other side terminal is grounded.

Figure 3:
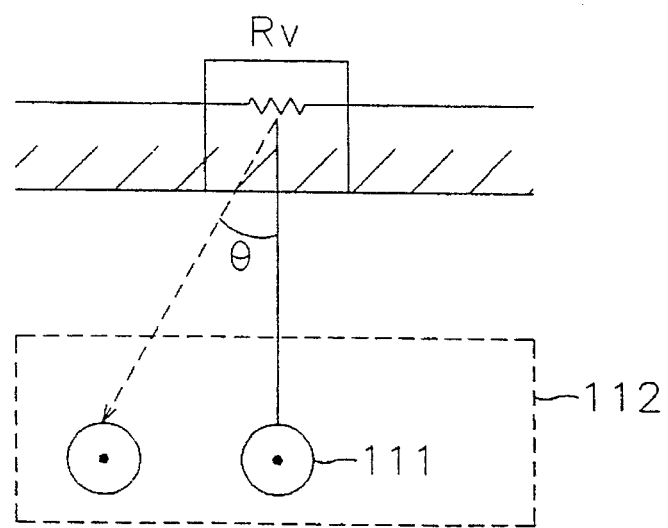
FIG. 3 is a diagram of the sensor of FIG. 2.

As shown in FIG. 3, the sensor 11 comprises a spherical mass ill connected with the above variable resistance Rv by a wire, and a fluid 112 to absorb vibration of the above mass 111.

The following description is about the operation of the system for controlling the shift position when the vehicle travels along the steeply sloped road or the sharply curved road in accordance with the preferred embodiment of the present invention.

The shift controller 50 initializes all operating circuits using variables as indicated at S110, and senses the road condition, that is, the sloping or curving condition as indicated at S120 when the voltage is applied by a driver.

The slope/curve sensor 10 outputs a corresponding electric signal to the shift controller 50 in response to the road condition.

The following description is about the operation of the above slope/curve sensor 10.

The spherical mass 111 forms an angle of slope according to the vehicle when the vehicle travels along the sloped road since the spherical mass 111 of the sensor 11 of the above slope/curve sensor 10 is gravitated toward the earth. A value of the resistance of the variable resistance Rv is changed by the change of the angle of slope since the mass 111 is connected with the variable resistance Rv by the wire which is not bent.

Accordingly, the angle of slope when the vehicle travels along the sloped road can be expressed by the change of the voltage applied to the variable resistance Rv.

The magnitude of voltage change due to the vibration of the mass 111 when the vehicle travels along the downhill road, the uphill road, or the curved road is set as an experimental value.

The mass 111 is soaked in the fluid 112 because of the vibration produced when the vehicle travels along an uneven road. The vibration produced when the vehicle travels along the uneven road should be absorbed into the fluid 112 using a drag force thereof, since the vibration produced when the vehicle travels along the uneven road should be distinguished from the vibration when the vehicle travels along the sloped road.

If the drag force of the fluid 112 becomes higher, the movement of the mass 111 becomes smaller, and the vibration below a predetermined frequency is absorbed into the fluid 112. The vibration remaining even after being absorbed into the fluid 112 is secondarily removed by software of the shift controller 50.

The fluid having a drag force may be selected to remove the frequency due to the vibration.

Forces operating on the sloping angle sensor are as follows:

a force operating on the movement of the mass 111 by accelerating the vehicle speed, a gravity operating on the mass 111, and a drag force interrupting the movement of the mass 111.

The force by accelerating the vehicle speed can be found as a value by calculating an acceleration of the vehicle speed output from the vehicle speed sensor 40. The gravity operating on the mass 111 can be easily calculated when determining the weight of the mass 111.

The drag force of the mass 112 can be expressed as follow:

$$F_D = C_D \pi \gamma^2 (0.5 \rho U\infty^2)$$

In the above equation, $U\infty$ is a speed of fluid in static state, $C_D$ is a coefficient of resistance, $\rho$ is a density of fluid, and $\gamma$ is a radius of mass.

The coefficient $C_D$ of resistance should be determined to obtain the drag force $F_D$ of the fluid, and the Reynold's number is applied to determine the coefficient $C_D$ of resistance.

In case the vibration of the mass 111 becomes high, that is, in case the vehicle travels along the steeply sloped road and the value of resistance of the variable resistance Rv becomes large, the amount of current flowing through the resistance R2 is relatively reduced, and the voltage V1 becomes low.

If the value of the variable resistance Rv becomes small in case the angle of the road is small, the amount of current flowing through the variable resistance Rv becomes large, and the amount of current flowing through the resistance R6 is relatively reduced, and the voltage V2 becomes low.

Each voltage signal V1 and V2 output from the slope or curve sensor 10 is input to the shift controller 50.

The shift controller 50 senses the road condition by the signal output from the slope or curve sensor 10, and senses a first steering angle according to the operation of the steering wheel by reading the signal input from the steering angle sensor 30.

The steering angle sensor 30 mounted on the steering wheel senses the steering angle according to the turn of the steering wheel, and outputs an electric signal corresponding to the shift controller 50 as indicated at S130.

After sensing the road condition, the shift controller 50 determines an acceleration (S140) by reading the signal input from the throttle valve sensor 20 and sensing the change of an opening size of the throttle valve per second.

The shift controller 50 senses the vehicle speed (S150) by reading the signal input from the vehicle speed sensor 40.

After sensing the road condition, the possible acceleration, and the vehicle speed, the shift controller 50 determines if the road is a downhill road which is sloped at over a predetermined angle as indicated at S160.

The shift controller 50 determines if the amount of voltage change output from the slope/curve sensor 10 corresponds to the downhill road. The shift controller sets a flag for the downhill road (S170) in case the road is downhill, and if not, the shift controller determines if the road is uphill (S180).

The shift controller 50 sets a flag for the uphill road as indicated at S190 in case the road is uphill, and if not, the shift controller determines if the road is curved (S200).

The shift controller 50 sets a flag for the curved road (S210) by determining the road to be curved in case the first steering angle is over a predetermined angle W1 corresponding to the time when the vehicle is travelling along the level road.

The shift controller 50 performs a control routine to control the vehicle according to the road condition by interrupting acceleration in case the road is downhill, uphill, or curved, and the vehicle speed is over a predetermined speed.

Figure 5:
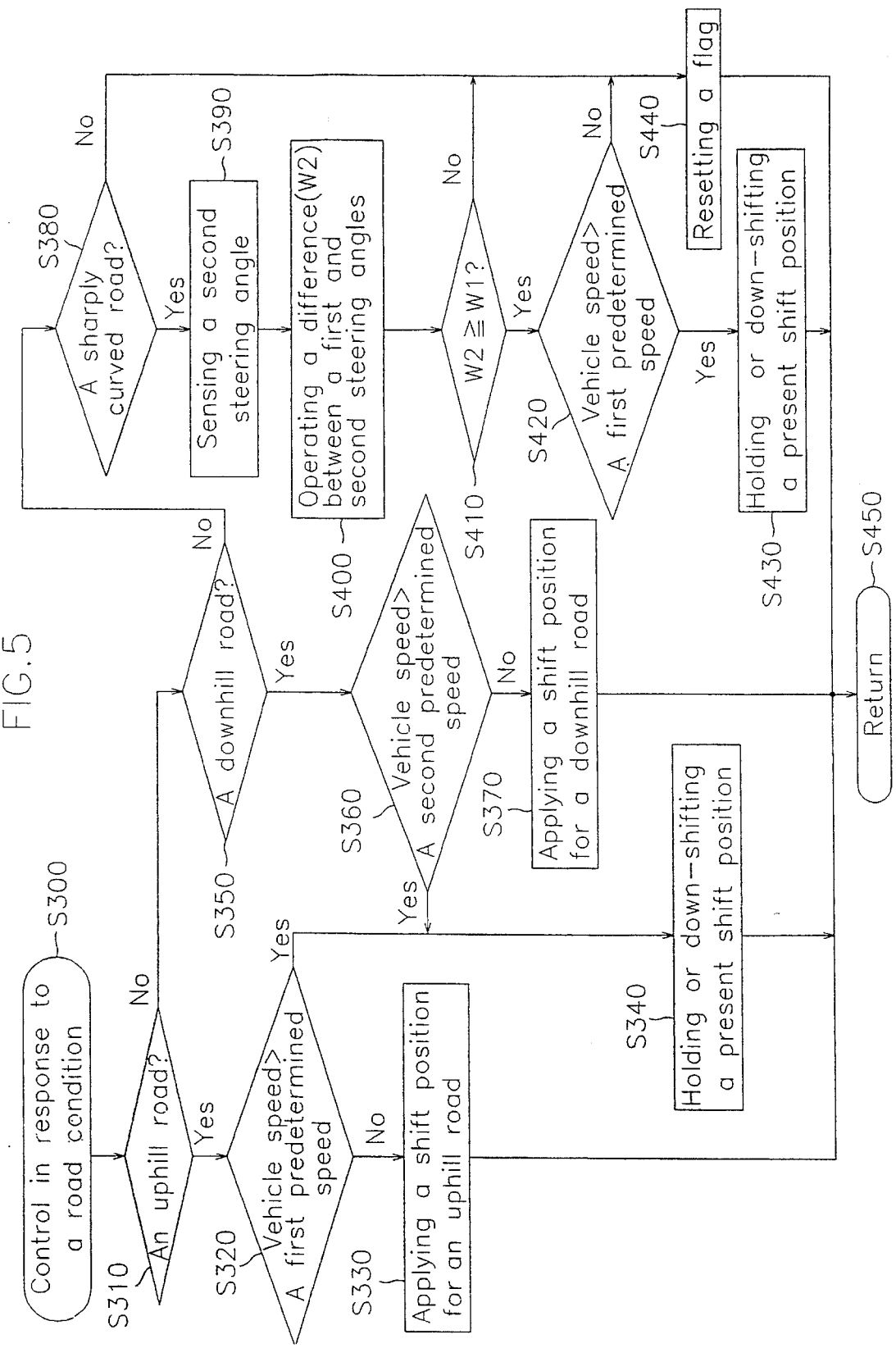
FIG. 5 is a flow chart of a subroutine showing the method for controlling the shift position when the vehicle travels along the steeply sloped road or the sharply curved road in accordance with the preferred embodiment of the present invention.

The vehicle control routine according to the road condition is as shown in FIG. 5, and the following description is directed to the control routine.

Figure 4:
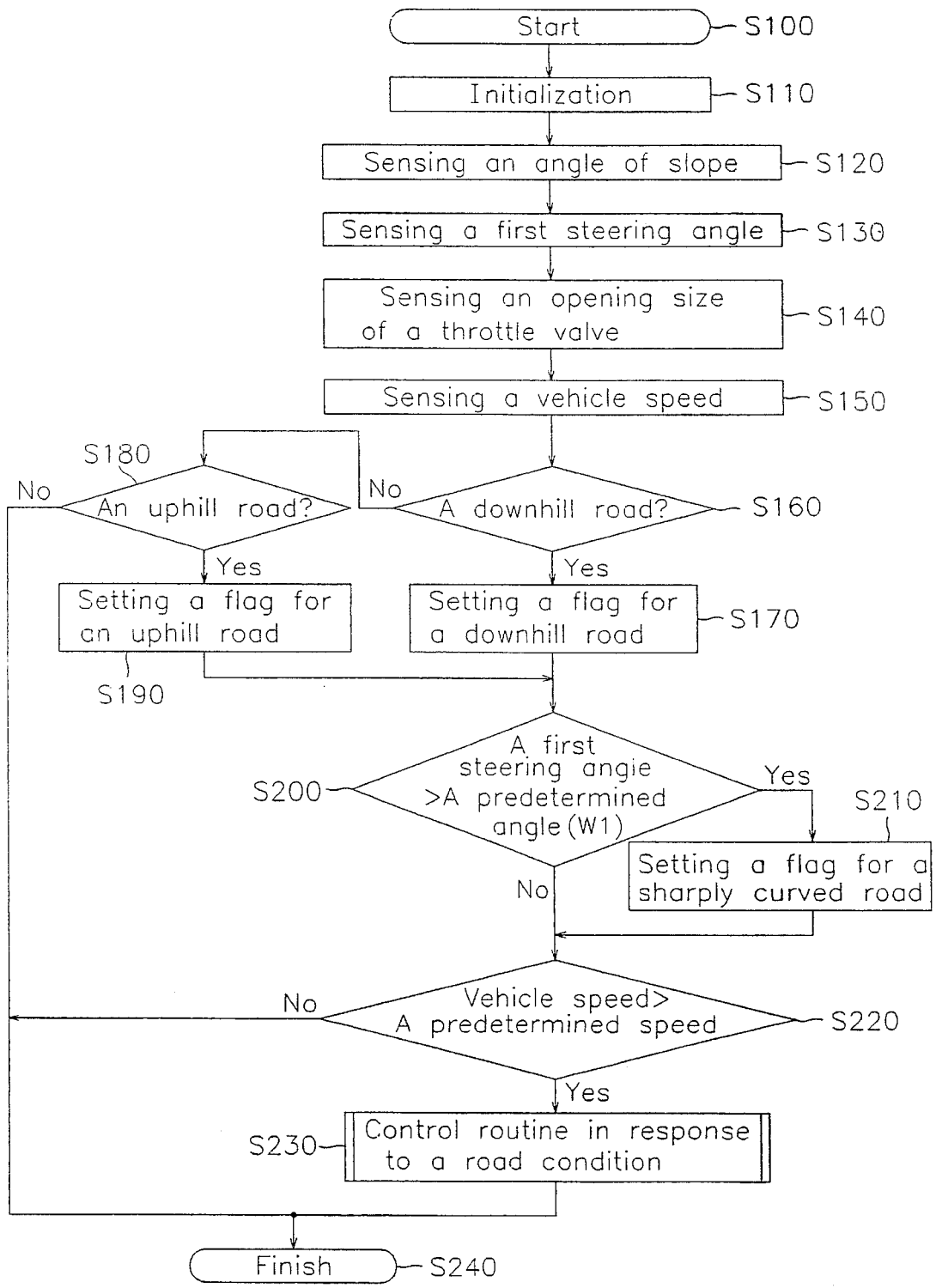
FIG. 4 is a flow chart showing a method for controlling a shift position when the vehicle travels along the steeply sloped road or the sharply curved road in accordance with the preferred embodiment of the present invention.

The shift controller 50 performs the control routine as shown in FIG. 5 if the interrupt occurs. In that case, the shift controller 50 reads all variables measured from the main routine as shown in FIG. 4, and uses all variables as the variables of the control routine.

The shift controller 50 determines if the road is uphill by reading the flag set in the main routine when the control routine according to the road condition starts performance.

The shift controller 50 determines if the vehicle runs at over a first predetermined speed (S310 to S320) corresponding to the occasion when the vehicle travels along the uphill road in case the road is determined to be uphill in the main routine.

The shift controller 50 operates the solenoid valve 60 (S330) according to the shift position corresponding to running on the uphill road determined by the present vehicle speed in case the vehicle travels along the uphill road at less than the first predetermined speed.

The shift controller 50 prevents the increase of vehicle speed (S340) by holding or down-shifting the present shift position to prevent the vehicle speed from further increasing the up-shift state still remaining due to the increase of the vehicle speed in case the present vehicle runs on the uphill road at over the first predetermined speed.

The shift controller 50 determines if the road is downhill when the road is not uphill. The shift controller 50 determines if the vehicle speed is over a second predetermined speed which is proper to the vehicle's travelling along the downhill road (S350 to S360) in case the road is determined to be downhill in the main routine.

The shift controller 50 operates the solenoid valve 60 (S370) according to the shift position corresponding to vehicle travelling along the downhill road determined by the present vehicle speed in case the vehicle travels along the downhill road at less than the second predetermined speed.

The shift controller 50 prevents the increase of vehicle speed (S340) by holding or down-shifting the present shift position since there can be an accident if the vehicle speed is further increased by an up-shift state still remaining due to the increase of vehicle speed in case the vehicle runs on the downhill road at over the first predetermined speed.

The shift controller 50 determines if the road is curved when the road is not downhill. The shift controller 50 determines the road to be curved and senses a second steering angle output from the slope/curve sensor 10 (S390) in case the steering angle according to the operation of the steering wheel is over a predetermined angle.

The mass 111 of the above slope/curve sensor 10 forms a certain angle by a turn of the vehicle body in case the driver turns the steering wheel by over a predetermined angle, different from when the vehicle travels along the downhill road or the uphill road.

The angle which the mass 111 forms is smaller than when the vehicle travels along the curved road, in case the driver instantaneously turns the steering wheel and back again to a former place to avoid an obstacle.

Values of voltage signals V1 and V2 output from the slope/curve sensor 10 are output as over a predetermined value since the angle which the mass 111 forms is over the predetermined angle in case the vehicle is travelling along the curved road.

The variable resistance Rv has a different value of resistance since the angle which the mass 111 forms has a different direction from the direction of angle formed when the vehicle is travelling along the uphill road or the downhill road.

The shift controller 50 operates the difference w2 between the first and second steering angles measured in the main routine (S400) after sensing the second steering angle output from the slope/curve sensor 10 as the above.

The shift controller 50 determines the relation between the difference w2 and a predetermined angle w1 (S410) after operating the difference w2 between the first and the second steering angles.

The shift controller 50 determines the relation between the present vehicle speed and the first predetermined speed (S420) by determining the road to be sharply curved in case the second steering angle is output by over a predetermined angle and the difference w2 between the first and second steering angles is over the predetermined angle w1.

The shift controller 50 prevents the increase of vehicle speed (S430) by holding or down-shifting the present shift position since there can be an accident if the vehicle speed is further increased by an up-shift state still remaining due to the increase of vehicle speed in case the vehicle travels along the curved road at over a first predetermined speed.

The shift controller 50 resets the flag for the curved road and returns to the main routine (S440 to S450) by determining that the road is not curved in case the difference w2 between the first and second steering angles is smaller than a predetermined angle or the present vehicle speed is under the first predetermined speed since the driver instantaneously turns the steering wheel and the value of the second steering angle output from the slope/curve sensor 10 is under the predetermined angle.

The control of the shift position according to the road condition is finished as indicated at S240 in case the road is determined not to be uphill, downhill or curved, or the vehicle speed is determined to be under the predetermined speed in the main routine.

Accordingly, the present invention provides the system and the method for controlling the shift position when the vehicle travels along the steeply sloped road or the sharply curved road to reduce the risk of an accident and protect the life of a driver by holding or down-shifting the present shift position and preventing the vehicle speed from further increasing due to upshifting of the shift position regardless of the driver's intention to reduce the speed when the vehicle having an automatic transmission travels along the steeply sloped road or the sharply curved road at over a predetermined speed.

Although only a preferred embodiment and select modifications of the invention have been disclosed and described, it is apparent that other embodiments and modifications of the invention are possible within the scope of the appended claims.

What is claimed is:

1. A device for controlling a shift position of a vehicle in response to a road condition when the vehicle travels along a steeply sloped road or a sharply curved road comprising:

first means for sensing an angular deviation of the vehicle about both a longitudinal axis thereof and a lateral axis perpendicular to the longitudinal axis, the angular deviation corresponding to any incline of a road, converting the sensed angular deviation into an electric signal, and outputting the signal, said first means including a mass which is soaked in fluid having a drag force, a variable resistance connected with said mass by a wire which is not bent, and a voltage output means for outputting a corresponding voltage according to a value of the variable resistance changed by a movement of said mass;

second means for sensing a steering angle of the vehicle in response to operation of a steering wheel, converting the sensed angle into an electric signal, and outputting the signal;

third means for sensing an opening size of a throttle valve cooperating with an accelerator pedal of the vehicle, converting the sensed opening size into an electric signal, and outputting the signal;

fourth means for sensing a running speed of the vehicle, converting the sensed speed into an electric signal, and outputting the signal;

fifth means responsive to said first means for sensing the angular deviation of the vehicle, said second means for sensing the steering angle of the vehicle, said third means for sensing the opening size of the throttle, and said fourth means for sensing the running speed of the vehicle, for selectively adjusting a current shift position upon detecting a reduction in speed, if the vehicle is angularly deviated and the vehicle runs at over the predetermined speed, and outputting a control signal representative of the selectively adjusted current shift position; and a solenoid valve for controlling a hydraulic pressure of the vehicle in response to the control signal outputted from said fifth means.

2. The device according to claim 1, wherein said fifth means determines if the vehicle is angularly deviated about the lateral axis thereof in an uphill or downhill incline by comparing the voltage output from said first means with a predetermined voltage, and determines if the vehicle is angularly deviated about the longitudinal axis thereof in response to a curved road condition by comparing a difference between signals output from said second means and said first means if both angular deviations are over a predetermined angle.

3. The device according to claim 1, wherein said mass is a spherical mass.

4. A method for controlling a shift position of a vehicle when the vehicle travels along a steeply sloped road or a sharply curved road comprising the steps of:

initializing all operating circuits and using variables when the vehicle starts, sensing an angular deviation of the vehicle about both a longitudinal axis thereof and a lateral axis perpendicular to the longitudinal axis, the position corresponding to any incline of a road, and sensing a first steering angle in response to operation of a steering wheel;

determining a reduction in vehicle speed by sensing a change of an opening size of a throttle valve per second, and sensing a present vehicle speed;

determining the angular deviation of the vehicle about the longitudinal and the lateral axes of the vehicle, setting a flag respectively corresponding to the angular deviation of the vehicle, and determining if the vehicle speed is over a predetermined speed; and performing a control routine in response to an angularly deviated condition of the vehicle by interrupting and completing a current routine if the vehicle is angularly deviated and the vehicle speed is over the predetermined speed wherein said control routine according to the angularly deviated condition of the vehicle includes the steps of:

determining a vehicle speed if the vehicle is determined to be upwardly angularly deviated about the lateral axis thereof by reading a predetermined flag, selectively adjusting the present shift position if the present vehicle speed is over a first predetermined speed, and establishing a speed area according to the shift pattern corresponding to the upward angular deviation of the vehicle if the present vehicle speed is under the first predetermined speed;

determining a vehicle speed if the vehicle is determined to be downwardly angularly deviated about the lateral axis thereof by reading the predetermined flag, selectively adjusting the present shift position if the present vehicle speed is over a second predetermined speed, and establishing the speed area according to the shift pattern corresponding to the downward angular deviation of the vehicle if the present vehicle speed is under the second predetermined speed;

sensing a second steering angle, and comparing the difference between the second steering angle and a first steering angle measured from the main routine if the vehicle is determined to be inclined about the longitudinal axis thereof by reading the predetermined flag;

determining the relationship between the predetermined angle and the difference between the first and second steering angles, determining the vehicle to be angularly deviated about the longitudinal axis thereof and sensing the vehicle speed if said difference is over a predetermined angle, and determining the vehicle not to be angularly deviated about the longitudinal axis thereof and resetting a flag for the vehicle angularly deviated about the longitudinal axis thereof if said difference is under the predetermined angle; and selectively adjusting the present shift position if the vehicle runs at over a first predetermined speed, and resetting the flag for the vehicle angularly deviated about the longitudinal axis thereof and returning to the main routine if the vehicle runs at below a predetermined speed, when the vehicle is determined to be inclined about the longitudinal axis thereof.

5. The method according to claim 4, wherein said step for determining the angular deviation of the vehicle includes the steps for determining if the vehicle is angularly deviated about a lateral axis of the vehicle by the value of the voltage output from said step of sensing an angular deviation, and determining the vehicle to be angularly deviated about the longitudinal axis of said vehicle if said first steering angle is over a predetermined angle.

6. A device for controlling a shift position of a vehicle in response to a road condition when the vehicle travels along a steeply sloped road or a sharply curved road comprising:

first means for sensing a turning of the vehicle about both a longitudinal axis thereof and a lateral axis perpendicular to the longitudinal axis, the turning corresponding to any incline of a road, converting the sensed turning into an electric signal, and outputting the signal;

second means for sensing a steering angle of the vehicle in response to the operation of a steering wheel, converting the sensed angle into an electric signal, and outputting the signal;

third means for sensing an opening size of a throttle valve cooperating with an accelerator pedal of the vehicle, converting the sensed opening size into an electric signal, and outputting the signal;

fourth means for sensing a running speed of the vehicle, converting the sensed speed into an electric signal, and outputting the signal;

fifth means, responsive to said first means for sensing the incline of the vehicle, said second means for sensing the steering angle of the vehicle, said third means for sensing the opening size of the throttle, and said fourth means for sensing the running speed of the vehicle, for selectively adjusting a current shift position upon detecting a reduction in speed, if the vehicle is inclined and the vehicle runs at over the predetermined speed, and outputting a control signal representative of the selectively adjusted current shift position; and a solenoid valve for controlling a hydraulic pressure of the vehicle in response to the control signal outputted from said fifth means, wherein said first means includes a spherical mass which is soaked in fluid having a drag force; a variable resistance connected with said mass by a wire which is not bent; and a voltage output means for outputting a corresponding voltage according to a value of the variable resistance changed by a vibration of said spherical mass.

7. The device according to claim 6, wherein said fifth means determines if the vehicle is inclined in an uphill or downhill orientation by comparing the voltage output from said first means with a predetermined voltage, and determines the vehicle to be inclined about the longitudinal axis thereof by comparing a difference between signals output from said second means and said first means if the value of both signals is over a predetermined angle.

8. A method for controlling a shift position of a vehicle when the vehicle travels along a steeply sloped road or a sharply curved road comprising the steps of:

initializing all operating circuits and using variables when the vehicle starts, and sensing an inclined condition of a road and a first steering angle in response to the operation of a steering wheel;

determining a reduction in vehicle speed by sensing a change of an opening size of a throttle valve per second, and sensing a present vehicle speed;

determining an inclined condition of the vehicle about a longitudinal axis of the vehicle and a lateral axis of the vehicle perpendicular to the longitudinal axis, setting a flag respectively corresponding to an incline of the vehicle, and determining if the vehicle speed is over a predetermined speed; and performing a control routine in response to an inclined condition of the vehicle by interrupting and completing a current routine if the vehicle is inclined and the vehicle speed is over the predetermined speed, wherein said control routine according to the inclined condition of the vehicle includes the steps of:

determining a vehicle speed if the vehicle is determined to be upwardly inclined about the lateral axis thereof by reading a predetermined flag, selectively adjusting the present shift position if the present vehicle speed is over a first predetermined speed, and establishing a speed area according to the shift pattern corresponding to the upward inclination of the vehicle if the present vehicle speed is under the first predetermined speed;

determining a vehicle speed if the vehicle is determined to be downwardly inclined about the lateral axis thereof by reading the predetermined flag, selectively adjusting the present shift position if the present vehicle speed is over a second predetermined speed, and establishing the speed area according to the shift pattern corresponding to the downward inclination of the vehicle if the present vehicle speed is under the second predetermined speed;

sensing a second steering angle output from the first means, and comparing the difference between the second steering angle and a first steering angle measured from the main routine if the vehicle is determined to be inclined about the longitudinal axis thereof by reading the predetermined flag;

determining the relationship between the predetermined angle and the difference between the first and second steering angles, determining the vehicle to be inclined about the longitudinal axis thereof and sensing the vehicle speed if said difference is over a predetermined angle, and determining the vehicle not to be inclined about the longitudinal axis thereof and resetting a flag for the vehicle inclined about the longitudinal axis if said difference is under the predetermined angle; and selectively adjusting the present shift position if the vehicle runs at over a first predetermined speed, and resetting the flag for the vehicle inclined about the longitudinal axis thereof and returning to the main routine if the vehicle runs at below a predetermined speed, when the vehicle is determined to be inclined about the longitudinal axis thereof.

9. The method according to claim 8, wherein said step for determining the inclined condition of the vehicle includes the steps for determining if the vehicle is inclined about a lateral axis of the vehicle by the value of the voltage output from a first means, and determining the vehicle to be inclined about a longitudinal axis of said vehicle if said first steering angle is over a predetermined angle.

* * * * *